(12) United States Patent
Fendya et al.

(10) Patent No.: US 8,048,315 B2
(45) Date of Patent: Nov. 1, 2011

(54) FLUID TREATMENT ARRANGEMENTS AND METHODS

(75) Inventors: Thomas J. Fendya, Homer, NY (US); Xianyao Shen, Ithaca, NY (US); Tanweer ul Haq, Tully, NY (US); Mark F. Hurwitz, Ithaca, NY (US); Stephen A. Geibel, Cortland, NY (US)

(73) Assignee: Pall Corporation, Port Washington, NY (US)

( * ) Notice: Subject to any disclaimer, the term of this patent is extended or adjusted under 35 U.S.C. 154(b) by 764 days.

(21) Appl. No.: 12/180,606

(22) Filed: Jul. 28, 2008

(65) Prior Publication Data
US 2010/0018924 A1    Jan. 28, 2010

(51) Int. Cl.
*B01D 21/34* (2006.01)
*B01D 61/00* (2006.01)
*B01D 63/10* (2006.01)

(52) U.S. Cl. .................. 210/739; 210/137; 210/321.74; 210/321.76

(58) Field of Classification Search .................. 210/739, 210/137, 321.74, 321.76
See application file for complete search history.

(56) References Cited

U.S. PATENT DOCUMENTS

| | | | |
|---|---|---|---|
| 1,872,430 A | 8/1932 | Ericson | |
| 3,266,223 A | 8/1966 | Dresser et al. | |
| 3,367,504 A | 2/1968 | Westmoreland | |
| 3,386,583 A | 6/1968 | Merten | |
| 3,417,870 A | 12/1968 | Bray | |
| 3,455,460 A | 7/1969 | Mahon et al. | |
| 3,722,696 A | 3/1973 | Dwyer et al. | |
| 3,827,564 A | 8/1974 | Rak | |
| 3,925,037 A | 12/1975 | Ward, III et al. | |
| 3,993,816 A | 11/1976 | Baudet et al. | |
| 4,083,780 A | 4/1978 | Call | |
| 4,105,547 A | 8/1978 | Sandblom | |
| 4,252,651 A | 2/1981 | Soderstrom | |

(Continued)

FOREIGN PATENT DOCUMENTS
DE         1 792 446        4/1971
(Continued)

OTHER PUBLICATIONS

Belfort et al., "The Behavior of Suspensions and macromolecular Solutions in Crossflow Microfiltration", Journal of Membrane Science, 96 (1994) 1-58.

(Continued)

*Primary Examiner* — David A Reifsnyder
(74) *Attorney, Agent, or Firm* — Leydig, Voit & Mayer, Ltd.

(57) ABSTRACT

Fluid treatment arrangements and methods involve a plurality of fluid treatment modules and a core assembly that extends through the plurality of fluid treatment modules. Each fluid treatment module has a feed region, a permeate region, and a fluid treatment medium separating the feed region from the permeate region. The feed region extends along a feed surface of the fluid treatment medium, and the permeate region extends along a permeate surface of the fluid treatment region. Feed fluid is directed along the feed region of each module, and a portion of the feed fluid passes as permeate through the fluid treatment medium, into the permeate region, and then into the core assembly. One or more control mechanisms are fluidly coupled to the permeate region of one or more fluid treatment modules to control a flow parameter in the permeate region of the module.

28 Claims, 8 Drawing Sheets

U.S. PATENT DOCUMENTS

| | | | |
|---|---|---|---|
| 4,411,785 A | 10/1983 | Yu et al. | |
| 4,412,553 A | 11/1983 | Kopp et al. | |
| 4,435,289 A | 3/1984 | Breslau | |
| 4,624,784 A | 11/1986 | Lefebvre | |
| 4,661,458 A | 4/1987 | Berry et al. | |
| 4,715,955 A | 12/1987 | Friedman | |
| 4,735,718 A | 4/1988 | Peters | |
| 4,746,436 A | 5/1988 | Kopp et al. | |
| 4,756,835 A | 7/1988 | Wilson | |
| 4,792,401 A | 12/1988 | Truex et al. | |
| 4,814,079 A | 3/1989 | Schneider | |
| 4,849,102 A | 7/1989 | Latour et al. | |
| 4,855,058 A | 8/1989 | Holland et al. | |
| 4,867,876 A | 9/1989 | Kopf | |
| 4,882,050 A | 11/1989 | Kopf | |
| 4,885,087 A | 12/1989 | Kopf | |
| 4,895,806 A | 1/1990 | Le et al. | |
| 4,935,142 A | 6/1990 | Sternberg | |
| 4,956,085 A | 9/1990 | Kopf | |
| 4,969,997 A | 11/1990 | Klüver et al. | |
| 5,034,124 A | 7/1991 | Kopf | |
| 5,049,268 A | 9/1991 | Kopf | |
| 5,096,582 A | 3/1992 | Lombardi et al. | |
| 5,114,582 A | 5/1992 | Sandstrom et al. | |
| 5,128,037 A | 7/1992 | Pearl et al. | |
| 5,143,630 A | 9/1992 | Rolchigo | |
| 5,147,541 A | 9/1992 | McDermott, Jr. et al. | |
| 5,232,589 A | 8/1993 | Kopf | |
| 5,248,418 A | 9/1993 | Munch | |
| 5,256,294 A | 10/1993 | Van Reis | |
| 5,304,312 A | 4/1994 | Forster et al. | |
| 5,342,517 A | 8/1994 | Kopf | |
| 5,437,796 A | 8/1995 | Brüschke et al. | |
| 5,490,926 A | 2/1996 | Hammeken | |
| 5,490,937 A | 2/1996 | van Reis | |
| 5,525,144 A | 6/1996 | Gollan | |
| 5,544,171 A | 8/1996 | Gödecker | |
| 5,593,580 A | 1/1997 | Kopf | |
| 5,620,605 A | 4/1997 | Moøller | |
| 5,679,249 A | 10/1997 | Fendya et al. | |
| 5,681,464 A | 10/1997 | Larsson | |
| 5,685,990 A | 11/1997 | Saugmann et al. | |
| 5,693,229 A | 12/1997 | Hartmann | |
| 5,716,559 A | 2/1998 | Larsen et al. | |
| 5,824,217 A | 10/1998 | Pearl et al. | |
| 5,945,000 A | 8/1999 | Skidmore et al. | |
| 6,001,974 A | 12/1999 | Demmer et al. | |
| 6,068,771 A | 5/2000 | McDermott et al. | |
| 6,088,592 A | 7/2000 | Doner et al. | |
| 6,212,407 B1 | 4/2001 | Hiramatsu | |
| 6,251,275 B1 | 6/2001 | Rekers | |
| 6,304,759 B1 | 10/2001 | Jiang et al. | |
| 6,363,261 B1 | 3/2002 | Raghavan | |
| 6,432,310 B1 | 8/2002 | Andou et al. | |
| 6,478,969 B2 | 11/2002 | Brantley et al. | |
| 6,533,937 B1 | 3/2003 | Adachi et al. | |
| 6,537,456 B2 | 3/2003 | Mukhopadhyay | |
| 6,565,747 B1 | 5/2003 | Shintani et al. | |
| 6,622,020 B1 | 9/2003 | Seki | |
| 6,702,941 B1 | 3/2004 | Haq et al. | |
| 7,316,780 B1 | 1/2008 | Fendya et al. | |
| 7,357,866 B2 | 4/2008 | Diemer et al. | |
| 7,691,266 B2 * | 4/2010 | Fendya et al. | 210/321.76 |
| 2002/0134724 A1 | 9/2002 | Heine et al. | |
| 2003/0034293 A1 | 2/2003 | Simonetti | |
| 2005/0029192 A1 | 2/2005 | Arnold et al. | |
| 2005/0056600 A1 | 3/2005 | Ranney | |
| 2008/0251444 A1 | 10/2008 | Fendya et al. | |
| 2009/0255877 A1 * | 10/2009 | Bair et al. | 210/739 |

FOREIGN PATENT DOCUMENTS

| | | |
|---|---|---|
| DE | 3 927 455 C1 | 8/1990 |
| DE | 3 448 391 C2 | 11/1991 |
| DE | 4 114 611 A1 | 11/1991 |
| DE | 4 342 485 C1 | 3/1995 |
| DE | 4 427 354 A1 | 2/1996 |
| DE | 201 06 646 U1 | 9/2001 |
| EP | 0 078 659 A2 | 5/1983 |
| EP | 0 443 257 A1 | 8/1991 |
| EP | 2 008 705 A1 | 12/2008 |
| GB | 1 417 973 | 12/1975 |
| JP | 59-073008 | 4/1984 |
| JP | 60-041505 | 3/1985 |
| JP | 62-204802 | 9/1987 |
| JP | 63-097207 | 4/1988 |
| JP | 05-208120 | 8/1993 |
| JP | 09-141060 | 6/1997 |
| JP | 11-267470 A | 10/1999 |
| WO | WO 96/01676 | 1/1996 |
| WO | WO 97/13571 | 4/1997 |
| WO | WO 00/13767 A1 | 3/2000 |
| WO | WO 00/78436 | 12/2000 |
| WO | WO 01/58575 A1 | 8/2001 |
| WO | WO 01/89669 A2 | 11/2001 |
| WO | WO 02/32533 A2 | 4/2002 |
| WO | WO 03/055580 A1 | 7/2003 |
| WO | WO 2005/094963 A1 | 10/2005 |
| WO | WO 2007/038542 A2 | 4/2007 |

OTHER PUBLICATIONS

Donaldson Technology "Introducing Donaldson PowerCore Filtration Technology", Brochure No. F111112 (Mar. 2002).

Hammer et al, "Quantitative Flow Measurements in Bioreactors by Nuclear Magnetic Resonance Imaging", Biotechnology, vol. 8, No. 4, Apr. 1990.

Koch "Membrane Systems Launches World's Largest Reverse Osmosis Element", Koch Membrane Systems, Inc., (1998).

International Preliminary Examination Report for International Application No. PCT/US00/02071.

* cited by examiner

FLUID TREATMENT ARRANGEMENTS AND METHODS

GENERAL DISCLOSURE OF THE INVENTION

The present invention relates to fluid treatment arrangements and methods for crossflow treatment of fluids, including gases, liquids, or mixtures of gases, liquids, and/or solids. A fluid treatment arrangement may comprise a permeable fluid treatment medium, a feed region, and a permeate region. The fluid treatment medium has a feed surface and an opposite permeate surface. The feed region extends along the feed surface of the fluid treatment medium. The permeate region extends along the permeate surface of the fluid treatment medium and is fluidly isolated from the feed region except through the permeable fluid treatment medium. A process or feed fluid may be directed through the feed region in a crossflow manner, e.g., tangentially along the feed surface of the fluid treatment medium from a feed end to a retentate end of the fluid treatment medium. As the feed fluid passes along the feed surface of the fluid treatment medium, a portion of the fluid, i.e., the filtrate or permeate, may pass from the feed surface through the fluid treatment medium to the permeate surface and into the permeate region. This portion of the fluid is treated by the fluid treatment medium. The remainder of the feed fluid, i.e., the concentrate or retentate, passes out of the feed region through the retentate end of the fluid treatment module.

Fluid treatment arrangements and methods embodying one or more aspects of the invention may be used to treat fluids in a wide variety of ways. In many embodiments, the fluid treatment arrangements and methods may be used in a separation process to separate one or more substances from the fluid. For example, the separation process may be a filtration process where a fluid, for example, a liquid, is directed along and/or through the fluid treatment medium and substances in the fluid, e.g., solids or molecules above a certain size, are generally prevented from passing through the fluid treatment medium. Embodiments of the invention may be used in virtually all filtration processes and with virtually all types of filtration media, including microfiltration, ultrafiltration, nanofiltration, and reverse osmosis media. As another example, the separation process may be a capture process where fluid, for example, a liquid, is directed along and/or through the fluid treatment medium and substances in the fluid, e.g., ions, molecules, proteins, nucleic acids, or other chemical substances, are chemically and/or physically bound to the fluid treatment medium. Some of the many specific applications for embodiments of the invention include dairy processing operations, such as casein concentration and milk serum protein concentration; beverage processing operations, such as beer or wine filtration or clarification; and biotech operations, such as cell harvesting, cell lysate concentration, and protein separation.

SUMMARY OF THE INVENTION

In accordance with one aspect of the invention, fluid treatment arrangements may comprise a plurality of fluid treatment modules, a core assembly, and one or more control mechanisms. Each module may include a permeable fluid treatment medium, a feed region, a permeate region, a feed end, and a retentate end. The fluid treatment medium may include a feed surface and an opposite permeate surface. The feed region extends along the feed surface of the fluid treatment medium, and the permeate region extends along the permeate surface. The feed end of the module fluidly communicates with the feed region and is sealed from the permeate region. The retentate end of the module also fluidly communicates with the feed region and is sealed from the permeate region. The plurality of fluid treatment modules may be fluidly coupled to one another, the retentate end of one fluid treatment module fluidly communicating with the feed end of a succeeding fluid treatment module. The core assembly extends through the plurality of fluid treatment modules and has one or more permeate passages that fluidly communicate with the permeate regions of the fluid treatment modules. The one or more control mechanisms may include a control mechanism which is fluidly coupled to the permeate region of at least one fluid treatment module to control a flow parameter in the permeate region of the module. For many embodiments, the fluid treatment arrangements may include a plurality of control mechanisms respectively coupled to the plurality of fluid treatment modules to control a flow parameter in the permeate region of each module.

In accordance with another aspect of the invention, fluid treatment arrangements may comprise a core assembly, a plurality of fluid treatment modules, and one or more control mechanisms. The core assembly has a longitudinal axis, and the plurality of fluid treatment modules may be mounted around the core assembly and axially positioned along the core assembly. Each module includes a permeable fluid treatment medium, a feed region, a permeate region, a feed end, and a retentate end. The fluid treatment medium may have a feed surface and an opposite permeate surface. The feed region extends along the feed surface of the fluid treatment medium, and the permeate region extends along the permeate surface of the fluid treatment medium. The feed end of the module fluidly communicates with the feed region and is sealed from the permeate region. The retentate end also fluidly communicates with the feed region and is sealed from the permeate region. The plurality of fluid treatment modules may be fluidly coupled to one another along the core assembly, the retentate end of one fluid treatment module fluidly communicating with the feed end of a succeeding fluid treatment module. The one or more control mechanisms may include a control mechanism which is fluidly coupled to a permeate region of at least one fluid treatment module through the core assembly to control a flow parameter in the permeate region of the fluid treatment module. For many embodiments, the fluid treatment arrangements may include a plurality of control mechanisms respectively coupled to the plurality of fluid treatment modules through the core assembly to control a flow parameter in the permeate region of each module.

In accordance with another aspect of the invention, methods of treating a fluid may comprise passing a feed fluid through feed regions and along feed surfaces of permeable fluid treatment media of a plurality of fluid treatment modules, including directing feed fluid from the feed region at the retentate end of one fluid treatment module into the feed region at the feed end of a succeeding fluid treatment module. The methods may also comprise passing, in each fluid treatment module, a portion of the feed fluid in the feed region as permeate from a feed surface of the fluid treatment medium through the fluid treatment medium to a permeate surface of the fluid treatment medium and into a permeate region. The methods may further comprise passing permeate from the permeate region of each fluid treatment module into and axially along a core assembly which extends through the plurality of fluid treatment modules. The methods may still further comprise passing permeate from the permeate region of at least one fluid treatment module through a control mechanism, including controlling a flow parameter in the permeate region of the at least one module.

Embodiments of the invention provide many advantages. For example, the flow parameters in a permeate region which are controlled by the control mechanism may include the transmembrane pressure across the permeable fluid treatment medium, the permeate flux through the fluid treatment medium, the pressure within the permeate region, and/or the resistance to permeate flow within the permeate region. By controlling a flow parameter in the permeate region of one or more of the fluid treatment modules, little or no variation in transmembrane pressure or permeate flux may be provided from module to module of the fluid treatment arrangement. Consequently, embodiments of the invention are subject to less uneven fouling of the fluid treatment media from module to module, yielding greater throughput and/or increased service life.

DESCRIPTION OF EMBODIMENTS

Figure 1:
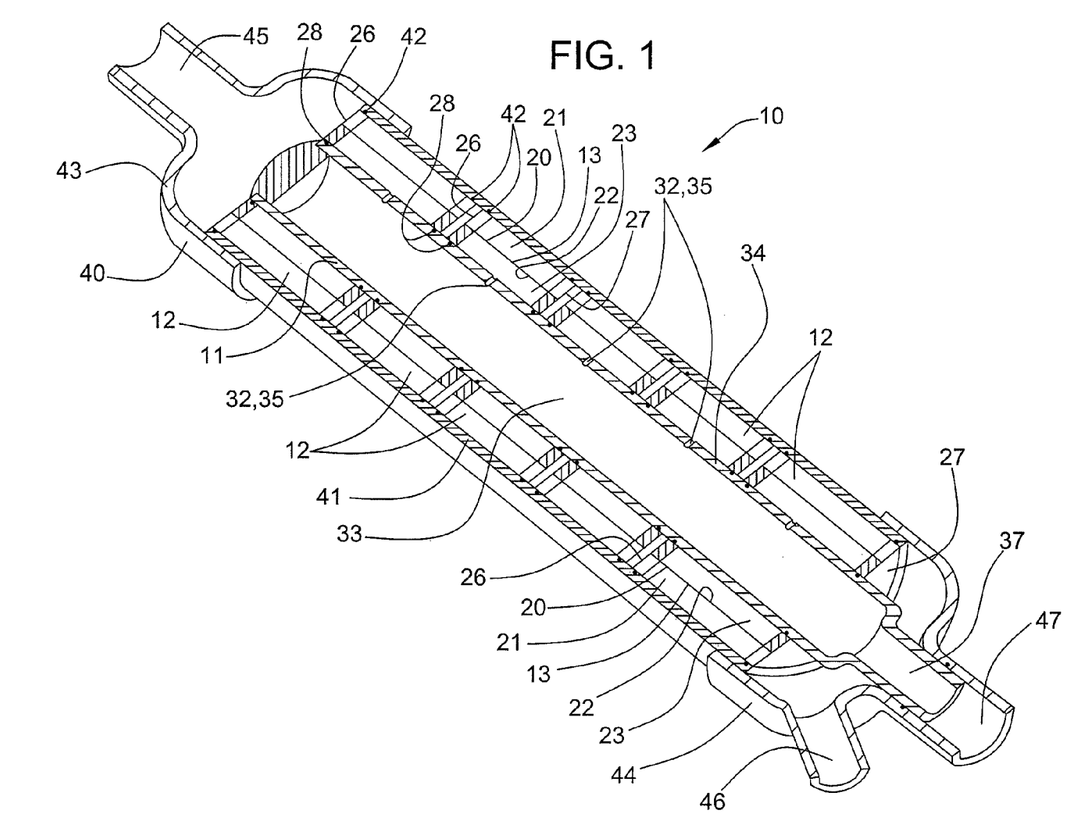
FIG. 1 is a representational view of a fluid treatment arrangement.

Fluid treatment arrangements embodying one or more aspects of the invention may be configured in a wide variety of ways. One of the many different examples of a fluid treatment arrangement is shown in FIG. 1, but fluid treatment arrangements embodying one or more aspects of the invention are not limited to the fluid treatment arrangement shown in FIG. 1 or any of the other figures. In FIG. 1, the fluid treatment arrangement 10 may include a core assembly 11 having a longitudinal axis and a plurality of fluid treatment modules 12 mounted around and positioned axially along the core assembly 11, the core assembly 11 extending through the fluid treatment modules 12. The fluid treatment modules 12 may, for example, be axially slid along the core assembly 11 and permanently or removably located in place around the core assembly 11 by any of numerous mechanical connections. The fluid treatment modules 12 may be fluidly coupled in series, may be similar to or different from one another, and may be positioned along the core assembly 11 spaced from or abutting one another.

Figure 2:
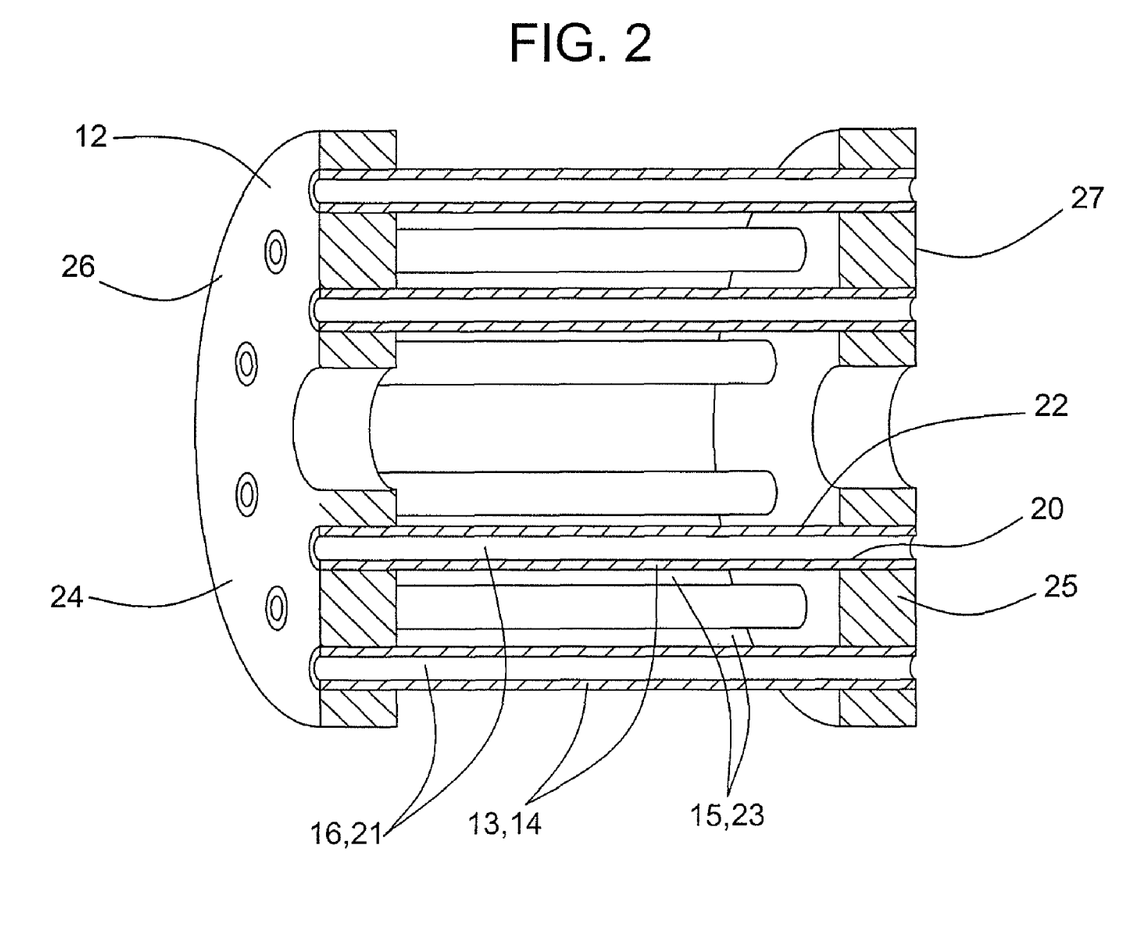
FIG. 2 is a cross sectioned oblique view of a fluid treatment module.

The fluid treatment modules 12 may be variously configured. For example, as shown in FIG. 2, a fluid treatment module 12 may include a permeable fluid treatment medium 13 comprising a plurality of permeable hollow fibers 14, each hollow fiber 14 defining an exterior 15 and an interior 16 which may be substantially free of structure. The hollow fibers may be arranged within the fluid treatment module in any of numerous ways. For some embodiments, the exterior surface of each hollow fiber may comprise the feed surface, and the exterior of the hollow fibers may comprise the feed region, while the interior surface of each hollow fiber may comprise the permeate surface and the interiors of the hollow fibers may comprise the permeate region. For other embodiments, including the embodiment shown in FIG. 2, the interior surface of each hollow fiber 14 may comprise the feed surface 20 and the interiors 16 of the hollow fibers 14 may comprise the feed region 21, while the exterior surface of each hollow fiber 14 may comprise the permeate surface 22 and the exterior 15 of the hollow fibers 14 may comprise the permeate region 23. The plurality of permeable hollow fibers 14 may extend between opposite end elements 24, 25. Each hollow fiber 14 may be sealingly fixed within each end element 24, 25 with the interior 16 of each hollow fiber 14 opening onto oppositely facing ends, e.g., a feed end 26 and a retentate end 27, of the fluid treatment module 12. The feed region 21 may fluidly communicate with the feed end 26 and the retentate end 27 of the module 12, while the permeate region 23 may be sealed from the feed end 26 and the retentate end 27 of the module 12. Further, the permeate region 23 may be fluidly isolated from the feed region 21 except through the permeable hollow fibers 14. The core assembly 11 may extend, for example, through the center of each end element 24, 25, and each end element 24, 25 may be sealed to the core assembly 11. For example, a fluid treatment module may be permanently mounted around the core assembly and the end element may be bonded or welded to the core assembly, or a fluid treatment module 12 may be removably mounted around the core assembly 11 and the end elements 24, 25 may be sealed to the core assembly 11, for example, by O-rings 28. The permeate region 23 of each fluid treatment module 12 may then be fluidly isolated from the permeate region 23 of an adjacent fluid treatment module 12 along the core assembly 11, while the feed regions 21 of the fluid treatment modules 12 fluidly communicate with one another.

Figure 3A:
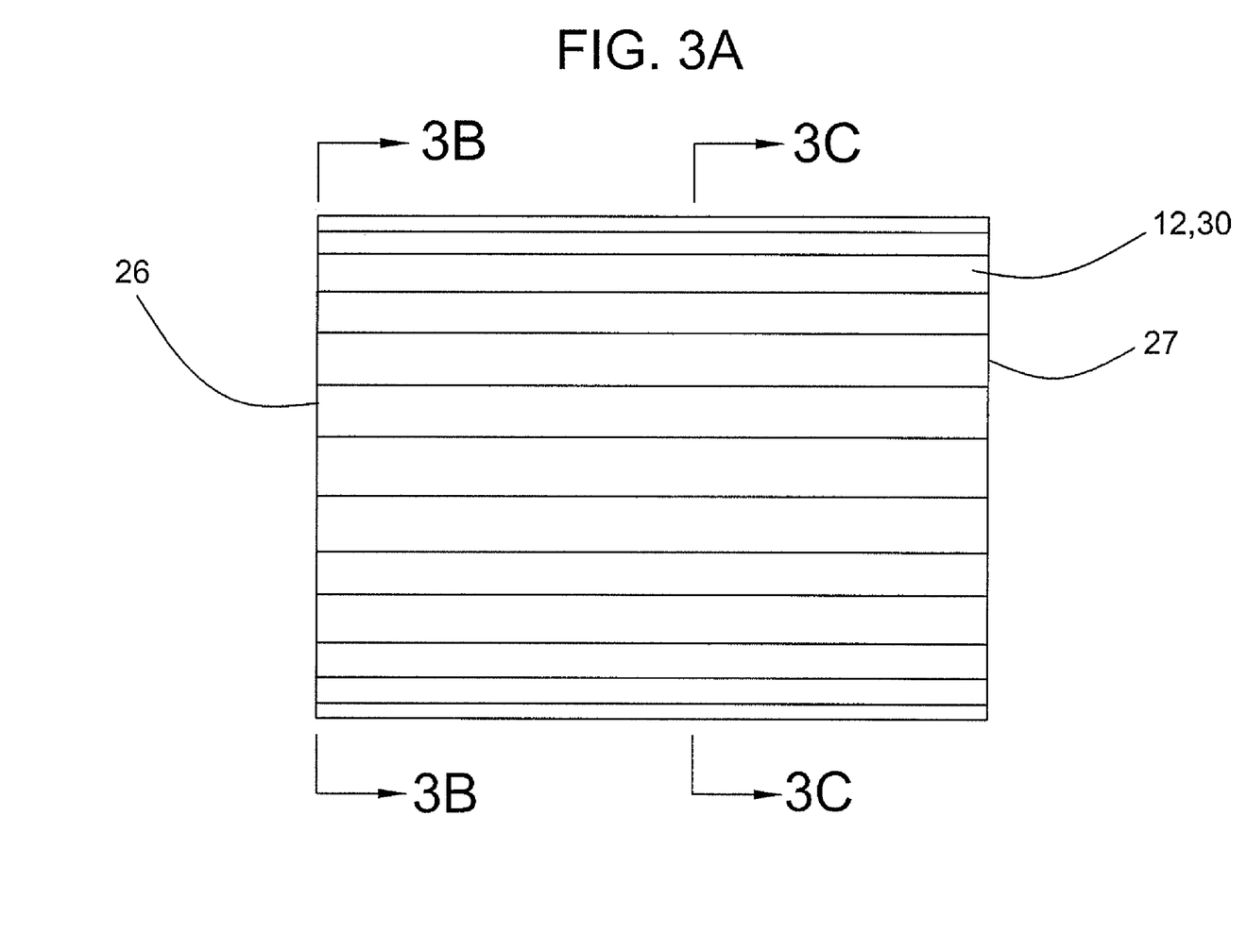
FIGS. 3A, 3B, and 3C are a side view, a portion of an end view, and a portion of a cross sectioned view of a pleated fluid treatment pack of another fluid treatment module.
Figure 3B:
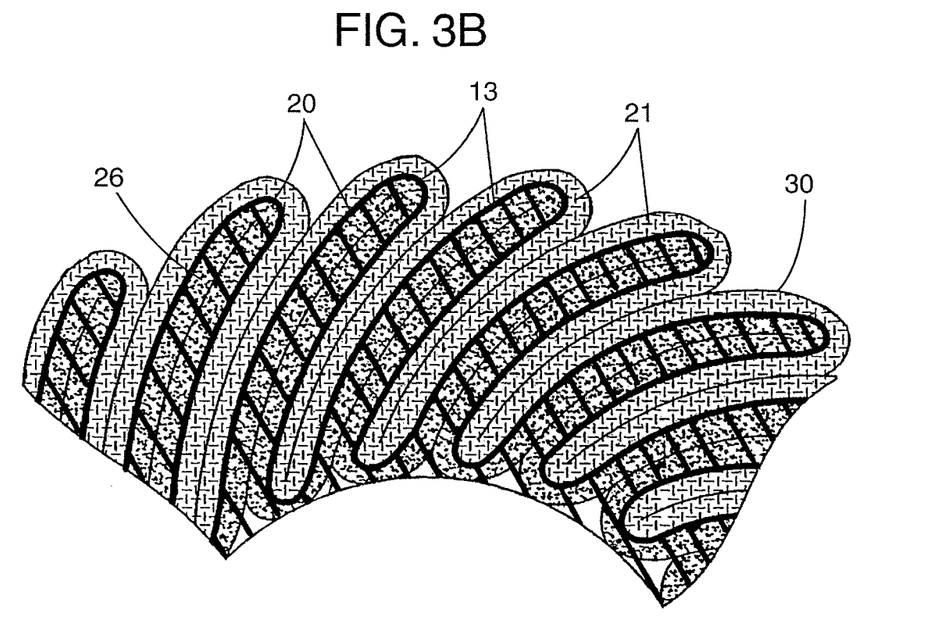
Figure 3C:
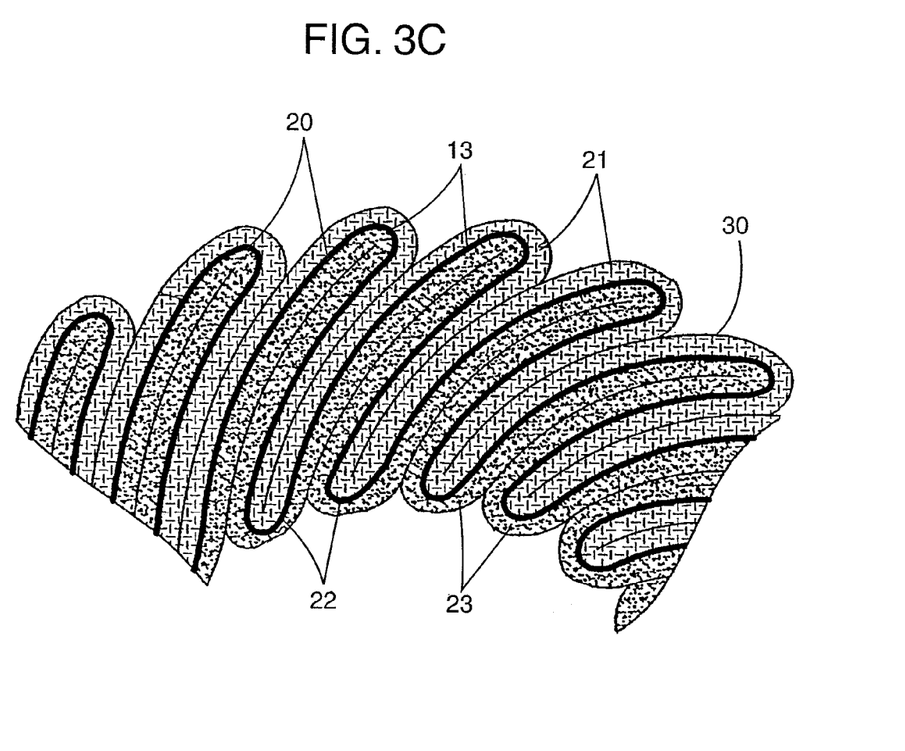

Another example of a fluid treatment module 12 may include a pleated fluid treatment pack 30 having a plurality of pleats, as shown in FIGS. 3A-3C. The pleated fluid treatment pack may be configured in a wide variety of ways. Some of the many examples of fluid treatment arrangements having pleated fluid treatment packs used for cross-flow treatment of fluids are disclosed, for example, in International Publications No. WO 00/13767, WO 2005/094963, and WO 2007/38542, which are incorporated herein by reference. As shown in FIG. 3C, the pleated fluid treatment pack 30 may include a sheet of a permeable fluid treatment medium 13 which has a feed surface 20 on one side and a permeate surface 22 on the opposite side, a feed region 21 which extends along the feed surface 20 of the fluid treatment medium 13, and a permeate region 23 which extends along the permeate surface 22 of the fluid treatment medium 13. The pleated fluid treatment pack 30 may have a hollow, generally cylindrical configuration and the plurality of pleats may extend axially between opposite ends, e.g., a feed end 26 and a retentate end 27, of the fluid treatment module 12. The plurality of pleats may include roots along the inner periphery of the pack 30 and crests or crowns along the outer periphery of the pack 30. The feed surface of the fluid treatment medium may be disposed facing radially outwardly, i.e., facing generally toward the outside, or facing radially inwardly, i.e. facing generally towards the inside of the cylindrical fluid treatment pack. For example, as shown in FIG. 3C, the feed surface 20 of the fluid treatment medium 13 and the feed region 21 may be disposed toward the outside of the cylindrical pleated fluid treatment pack 30, while the permeate surface 22 of the fluid treatment medium 13 and the permeate region 23 may be disposed toward the inside of the cylindrical pleated fluid treatment pack 30. The feed region 21 may open onto both the feed end 26 and the retentate end 27 of the cylindrical fluid treatment pack 30, and the permeate region 23, or the permeate region 23 and the fluid treatment medium 13, may be sealed at both the feed end 26 and the retentate end 27 by any of a variety of adhesive or non adhesive sealants, sealing the permeate region 23 from the feed end 26 and the retentate end 27 and from the feed region 21 except through the permeable fluid treatment medium 13. The core assembly 11 may pass through the hollow center of the pleated fluid treatment pack 30 along the roots of the pleats, and each end 26, 27 of the pack 30 may be sealed to the core assembly 11. For example, a fluid treatment module may be permanently mounted around the core assembly, and the sealed permeate region at each end of the fluid treatment pack may be bonded to the core assembly at the roots of the pleats. Alternatively, a fluid treatment module 12 may be removably mounted around the core assembly 11, and the sealed permeate region 23 at each end 26, 27 of the fluid treatment pack 30 may be further sealed to the core assembly 11 at the roots of the pleats, for example, by O-rings 28. The permeate region 23 of each fluid treatment module 12 may then be fluidly isolated from the permeate region 23 of an adjacent fluid treatment module 12 along the core assembly 11, while the feed regions 21 of the fluid treatment modules 12 fluidly communicate with one another.

Figure 4:
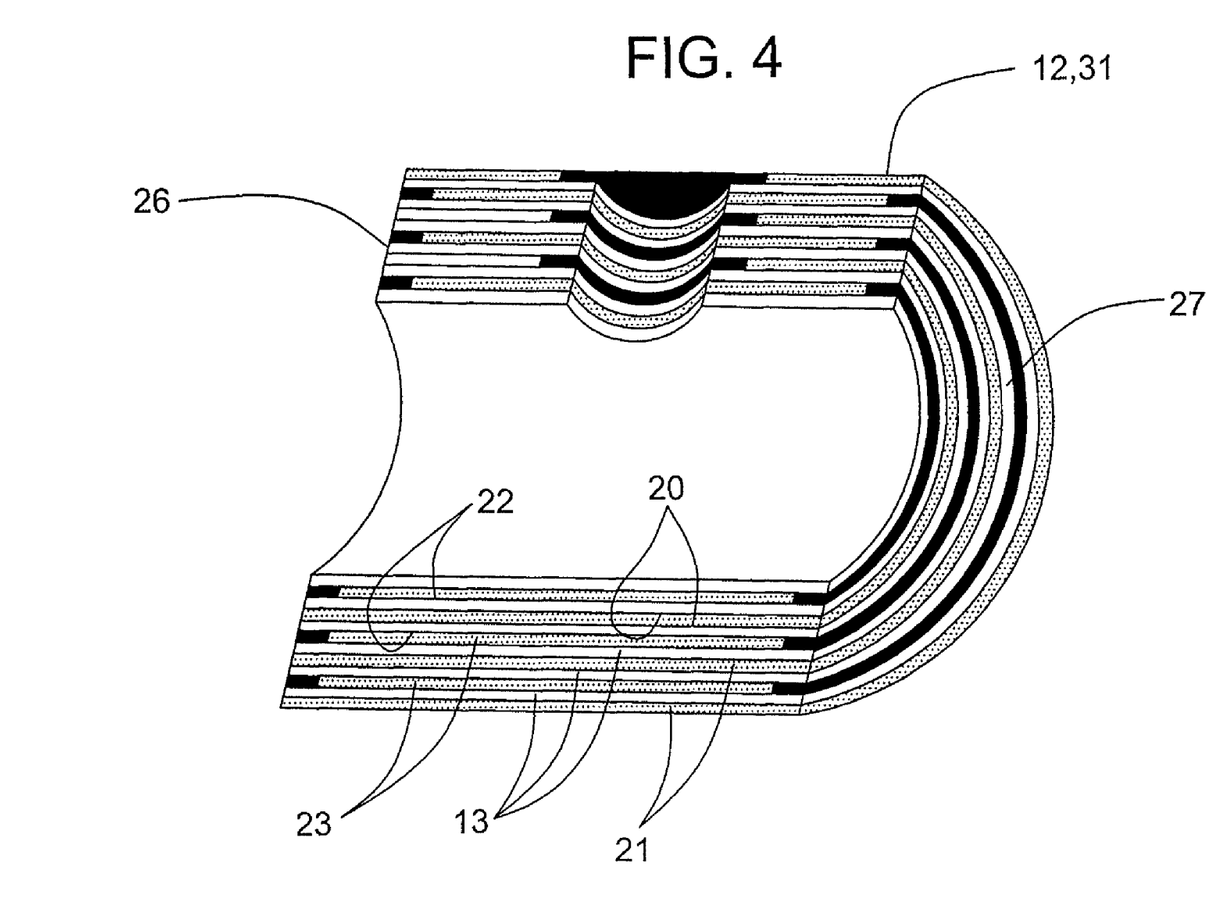
FIG. 4 is a cross sectioned oblique view of a spirally wound fluid treatment pack of another fluid treatment module.

Yet another example of a fluid treatment module 12 may include a spirally wound fluid treatment pack 31, as shown in FIG. 4. The spirally wound fluid treatment pack may be configured in a wide variety of ways. Some of the many examples of fluid treatment arrangements having spirally wound fluid treatment packs are disclosed, for example, in U.S. patent application Ser. No. 12/101392, filed on Apr. 11, 2008, now allowed, entitled Fluid Treatment Arrangements and Methods, and is incorporated herein by reference. As shown in FIG. 4, the spirally wound fluid treatment pack 31 may include a sheet of a permeable fluid treatment medium 13 which has a feed surface 20 on one side and a permeate surface 22 on the opposite side, a feed region 21 which extends along the feed surface 20 of the fluid treatment medium 13, and a permeate region 23 which extends along the permeate surface 22 of the fluid treatment medium 13. The fluid treatment pack 31 is spirally wound to form a hollow, generally cylindrical structure comprising a plurality of windings of the feed region 21, a plurality of windings of the fluid treatment medium 13, and a plurality of windings of the permeate region 23. The windings of the spirally wound fluid treatment pack 31 may extend between opposite ends, e.g., a feed end 26 and a retentate end 27, of the fluid treatment module 12. The windings of the feed region 21 may open onto both the feed end 26 and the retentate end 27, and the windings of the permeate region 23, or the windings of the permeate region 23 and the windings of the fluid treatment medium 13, may be sealed at both the feed end 26 and the retentate end 27 by any of a variety of adhesive or non adhesive sealants, sealing the permeate region 23 from the feed end 26 and the retentate end 27 and from the feed region 21 except through the permeable fluid treatment medium 13. At least one permeate port, which fluidly communicates with the windings of the permeate region 23 but is sealed from the windings of the feed region 21, may extend generally radially through most or all of the windings to facilitate permeate removal. The permeate port may, for example, be open at the inner end and may be capped at the outer end. The core assembly 11 may pass through the hollow center of the spirally wound fluid treatment pack 31 along the innermost winding, and each end 26, 27 of the pack 31 may be sealed to the core assembly 11. For example, a fluid treatment module may be permanently mounted around the core assembly, and the sealed permeate region at each end of the fluid treatment pack may be bonded to the core assembly at the innermost winding or windings. Alternatively, a fluid treatment module 12 may be removably mounted around the core assembly 11, and the sealed permeate region 23 at each end 26, 27 of the fluid treatment pack 31 may be further sealed to the core assembly 11 at the innermost winding or windings, for example, by O-rings 28. The permeate region 23 of each fluid treatment module 12 may then be fluidly isolated from the permeate region 23 of an adjacent fluid treatment module 12 along the core assembly 11, while the feed regions 21 of the fluid treatment modules 12 fluidly communicate with one another.

The fluid treatment medium of any of the fluid treatment modules may be fashioned from any of the numerous materials, including, for example, a natural or synthetic polymer, a metal, a ceramic, or fiberglass. The fluid treatment medium may be formed in a wide variety of permeable structures, including porous, permeable, semipermeable, or perm-selective structures. For example, the fluid treatment medium may comprise one or more permeable hollow fibers; a permeable membrane, including a supported or unsupported membrane sheet; a permeable fibrous structure, including a woven or non-woven fibrous or filamentous sheet; a permeable metal sheet, including a permeable sintered metal sheet; or a permeable foam sheet. For many embodiments, the fluid treatment medium may comprise a permeable polymeric membrane. The fluid treatment medium may comprise one layer or multiple layers. The layers of a fluid treatment medium may be similar to or different from one another and may contact or be spaced from one another. The fluid treatment medium may have, or may be modified to have, any of a myriad of treatment characteristics. For example, the fluid treatment medium may have any of a wide range of rejection characteristics for reverse osmosis or nanofiltration applications, any of a wide range of molecular weight cutoffs for nanofiltration or ultrafiltration applications, or any of a wide range of removal ratings for ultrafiltration or microfiltration applications. Further, the fluid treatment medium may have a positive, negative, or neutral electrical change; it may be liquiphobic or liquiphilic, including, for example, hydrophobic or hydrophilic or oleophobic or oleophilic; or it may include attached functional groups, such as ligands or any other reactive moiety, that can chemically bind to substances in the fluid.

The feed region and the permeate region of any of the fluid treatment modules may be structured in a wide variety of ways and may be similar to or different from one another. For example, one or both regions may comprise flow spaces substantially free of structure, including the interior of a hollow fiber. As another example, either or both regions may comprise spacers and flow spaces that are formed by the spacers and are substantially free of structure, as disclosed, for example, in International Publications No. WO 2005/094963 and WO 2007/38542 and in U.S. patent application Ser. No. 12/101,392, now allowed. The flow spaces may define, for example, elongate passageways that extend along most or substantially all of the feed surface and/or the permeate surface of the fluid treatment medium. The flow spaces readily facilitate the flow of feed fluid through the feed region along the feed surface of the fluid treatment medium or the flow of permeate through the permeate region along the permeate surface of the fluid treatment medium from one axial end to the opposite axial end of the fluid treatment module. As yet another example, either or both of the feed region and the permeate region may comprise a porous sheet material which extends along, and may contact, a surface of the fluid treatment medium. The porous sheet material may be coarser than the fluid treatment medium and may have an edgewise flow characteristic, e.g., an edgewise flow resistance, that facilitates the flow of feed fluid or permeate fluid edgewise within the porous sheet material parallel to the opposite major surfaces of the sheet material and along the feed surface or the permeate surface of the fluid treatment medium. For example, the porous sheet material may be formed from a natural or synthetic polymer and may comprise a nonwoven fibrous sheet or a netting, e.g., a mesh or a screen, including a woven, extruded, expanded, and/or embossed netting.

The fluid treatment arrangement 10 further includes one or more control mechanisms 32 operatively associated with the permeate region 23 of at least one of the fluid treatment modules 12. A control mechanism may be fluidly coupled to the permeate region in only one fluid treatment module to control a flow parameter in that module. Alternatively, one control mechanism may be fluidly coupled to the permeate regions in a group of two or more fluid treatment modules to control a flow parameter in each of the modules in that group. For many embodiments, the fluid treatment arrangement 10 includes a plurality of control mechanisms 32, and most or all of the permeate regions 23 of the fluid treatment modules 12 are respectively fluidly coupled to the control mechanisms 32 to control a flow parameter in the permeate region 23 of the corresponding module 12, as shown in FIG. 1. For example, each control mechanism 32 may be fluidly coupled to the permeate region 23 of one and only one fluid treatment module 12. The flow parameters controlled by the control mechanisms may include, for example, the permeate flux through the permeable fluid treatment medium, the transmembrane pressure, the pressure within the permeate region, and/or the resistance to permeate flow within the permeate region.

The control mechanisms may be variously configured, including as a passive device or an active device. For example, a control mechanism may comprise a restricted flow opening, including a fixed or variable orifice or capillary, or a valve, including an adjustable or variable valve. In the embodiment of FIG. 1, each control mechanism 32 may comprise a fixed flow restricting capillary. A control mechanism may also comprise a combination of any of these passive and active devices. The control mechanisms of a fluid treatment arrangement may be identical to or different from one another. For many embodiments, the control mechanisms may be configured to provide a predetermined relationship among the flow parameters from one fluid treatment module or group of modules to another along the core assembly. For example, the control mechanisms may be configured to provide permeate fluxes through the fluid treatment media of the plurality of fluid treatment modules that are similar to, including substantially equal to, one another.

The control mechanisms may be fluidly coupled to the permeate regions of the fluid treatment modules in a variety of ways. For example, the control mechanisms may be physically associated with the core assembly to fluidly communicate with the permeate regions of the fluid treatment modules. The core assembly may be configured in many different ways to accommodate the control mechanisms.

For example, as shown in FIG. 1, the core assembly 11 may include a longitudinal permeate flow passage 33. The longitudinal flow passage 33 may have a constant or a varying diameter, may be closed at one axial end of the core assembly 11 and open at the other axial end, and may be the only longitudinal flow passage in the core assembly 11 that fluidly communicates with the permeate regions 23 of the fluid treatment modules 12. The longitudinal passage 33 may fluidly communicate with the permeate regions 23 through the wall 34 of the core assembly 11. For example, the wall 34 of the core assembly 11 may have axially spaced openings 35 or sets of openings 35 that fluidly communicate between the longitudinal flow passage 33 and the permeate regions 23 of the fluid treatment modules 12, e.g., the exterior 15 of the hollow fibers 14 of FIG. 2, the inner permeate region 23 of the pleats of the pleated fluid treatment pack 30 of FIG. 3C, or the inner end of a permeate port or the innermost winding or windings of the permeate region 23 of the spirally wound fluid treatment pack 31 of FIG. 4. The control mechanisms 32, e.g., fixed capillaries, may be mounted in the openings 35 in the wall 34 of the core assembly 11, fluidly coupling each control mechanism 32 between a permeate region 23 of a fluid treatment module 12 and the longitudinal flow passage 33 to control one or more flow parameters in the permeate region 23 of the module 12. In the embodiment of FIG. 1, each control mechanism 32 may fluidly communicate with the permeate region 23 of only one fluid treatment module 12 and controls one or more flow parameters in the permeate region 23 of that module 12.

Figure 5:
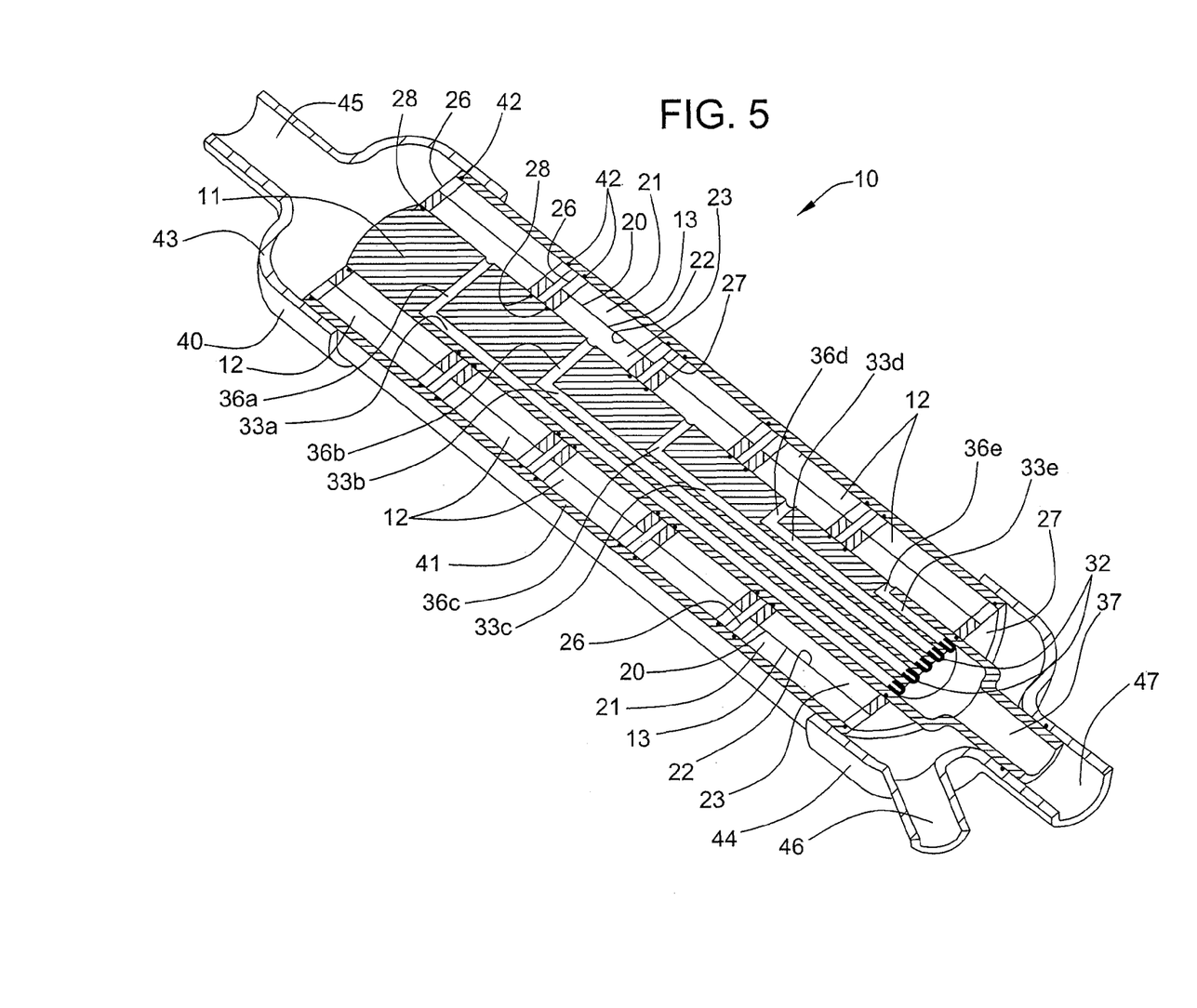
FIG. 5 is a representational view of another fluid treatment arrangement.

Another example of a fluid treatment arrangement 10 having a plurality of control mechanisms 32 physically associated with a core assembly 11 is shown in FIG. 5. Many features of the fluid treatment arrangement 10 of FIG. 5 are analogous to the features of the fluid treatment arrangement of FIG. 1 and have the same reference numerals. However, the core assembly may include a plurality of permeate flow passages, each fluidly coupled to a permeate region of a fluid treatment module and fluidly isolated from one another. For example, the core assembly 11 may include a plurality of longitudinal permeate flow passages 33a-e which open onto the same axial end of the core assembly 11. The core assembly 11 may further include a plurality of generally radial permeate flow passage 36a-e, each extending from one of the longitudinal flow passages 33a-e to the exterior of the wall 34 of the core assembly 11. At the exterior of the core assembly 11, each radial flow passage 36a-e may fluidly communicate with the permeate region 23 of a fluid treatment module 12. In the embodiment of FIG. 5, each longitudinal flow passage 33a-e fluidly communicates with the permeate region 23 of only one fluid treatment module 12 via one or more radial flow passages 36a-e fluidly coupled between the permeate region 23 of the fluid treatment module 12 and the longitudinal flow passage 33a-e. In other embodiments, two or more axially spaced radial flow passages fluidly communicating with the permeate regions of a group of two or more fluid treatment modules may be fluidly coupled to a single longitudinal flow passage, allowing the group of fluid treatment modules to fluidly communicate with the same longitudinal flow passage. The control mechanisms 32 may be positioned in the longitudinal flow passages 33a-e or the radial flow passages 36a-e to control a flow parameter in the permeate region 23 of a corresponding fluid treatment module 12. For example, a control mechanism 32, e.g., a fixed capillary, may be positioned at the end of each longitudinal flow passage 33a-e. Each control mechanism 32 then fluidly communicates with the permeate region 23 of a fluid treatment module 12 via the corresponding longitudinal flow passage 33a-e and radial flow passage 36a-e to control one or more flow parameters in the permeate region 23. From the end of the longitudinal flow passages 33a-e, the plurality of control mechanisms 32 may fluidly communicate with a common permeate outlet 37 at the end of the core assembly 11. In other embodiments, the fluidly isolated permeate flow passages, e.g., the longitudinal flow passages, may terminate at the end of the core assembly without any control mechanisms. A separate structure, for example, a cap, which includes the control mechanisms may be mounted, e.g., removably mounted, to the end of the core assembly with the control mechanisms fluidly communicating, respectively, with the ends of the longitudinal permeate passages.

The fluid treatment arrangement 10 may further include a housing assembly 40 which contains the plurality of fluid treatment modules 12. The housing assembly may be formed from any impermeable material, e.g., a metallic material or a polymeric material, which is compatible with the process parameters, e.g., the pressure and temperature and chemical composition of the fluid being treated. The housing assembly may be configured in any of numerous ways and may permanently contain the fluid treatment modules, e.g., forming a disposable fluid treatment arrangement, or may removably contain the fluid treatment modules, allowing used fluid treatment modules to be replaced with new or cleaned modules. The housing assembly may be oriented in any of numerous ways, including, for example, with the axis of the housing extending vertically and a permeate outlet port at the top and/or the bottom.

One of the many examples of a housing assembly 40 is shown in FIGS. 1 and 5. The housing assembly 40 may include a shell 41 that spans and surrounds all of the fluid treatment modules 12. Each module 12 may be sealed to the shell 41 in a variety of ways. For example, each module 12 may be sealed to the shell 41 by O-rings 42 at the ends of the modules 12 in a manner analogous to the way the modules 12 are sealed to the core assembly 11 by the O-rings 28. The housing assembly 40 may further include an inlet piece 43 permanently or removably sealed to one end of the shell 41, an outlet piece 44 permanently or removably sealed to the opposite end of the shell 41, and a plurality of ports, including a feed or process inlet port 45, a retentate or concentrate outlet port 46, and a permeate or filtrate outlet port 47. The housing assembly may include additional ports including ports for draining, venting, or cleaning. The ports may comprise any of a wide variety of fittings and may be positioned on the housing assembly in any of numerous locations. In the embodiments of FIGS. 1 and 5, inlet piece 43 may include the feed inlet port 45, which fluidly communicates with the feed end 26 of the initial fluid treatment module 12, and the outlet piece 44 may include the retentate outlet port 46, which fluidly communicates with the retentate end 27 of the final fluid treatment module 12, and the permeate outlet port 47, which fluidly communicates with the permeate passage(s) 33, 33*a-e* in the core assembly 11. The housing assembly may define fluid flow paths between the ports, and the fluid treatment modules may be positioned in the housing assembly in the fluid flow paths. For example, the fluid treatment modules 12 may be positioned in the housing assembly 40 with the feed regions 21 of the modules 12 in series in a first fluid flow path between the feed inlet port 45 and the retentate outlet port 46 and with the feed regions 21, the permeable fluid treatment media 13, the permeate regions 23, and the control mechanism(s) 32 in parallel in a second fluid flow path between the feed inlet port 45 and the permeate outlet port 47.

Fluids may be treated in any of numerous ways by fluid treatment arrangements and methods embodying the invention. In one mode of operation, a feed fluid may be directed into the feed region at the feed end of an initial fluid treatment module and through the feed region to the retentate end, where the feed fluid exits the initial module. The feed fluid then passes into the feed region at the feed end of the succeeding fluid treatment module and through the feed region to the retentate end, where the feed fluid exits the succeeding module. The feed fluid may continue to pass through the feed region from the feed end to the retentate end of each succeeding fluid treatment module until the feed fluid exits as retentate from the retentate end of the final fluid treatment module.

For example, as shown in FIG. 1, the feed fluid may enter the fluid treatment arrangement 10 via the feed inlet port 45 and may be directed by the housing assembly 40 along a first fluid flow path into the feed region 21 at the feed end 26 and through the feed region 21 to the retentate end 27 of each successive fluid treatment module 12. At the retentate end 27 of each fluid treatment module 12, the feed fluid may pass into a space between the ends 27, 26 of adjacent modules 12 before entering the feed end 26 of the adjacent module 12. The seals 42 between the housing assembly 40 and the fluid treatment modules 12, the seals 28 between the core assembly 11 and the modules 12, and the sealed ends of the permeate regions 23 prevent the feed fluid from bypassing the feed regions 21 or entering the permeate regions 23. From the retentate end 27 of the final fluid treatment module 12, the feed fluid exits the housing assembly 40 as retentate via the retentate outlet port 46.

Figure 6:
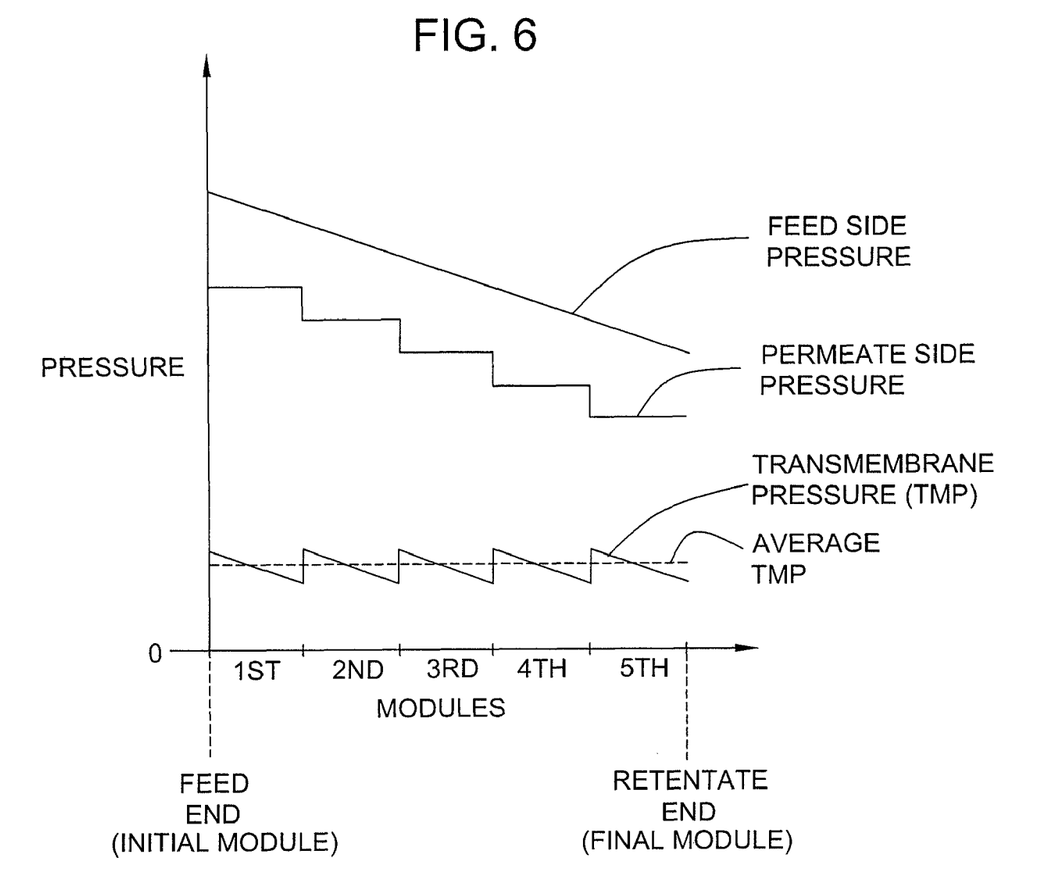
FIG. 6 is a graph of the crossflow pressure differential and the transmembrane pressure in the fluid treatment modules of a fluid treatment arrangement.

As the feed fluid flows through the feed region 21 of each fluid treatment module 12, the feed fluid flows tangentially along the feed surface 20 of the permeable fluid treatment medium 13 and may generate shear near, including at, the feed surface 20 of the medium 13. The amount of shear depends on many factors, including, for example, the dimensions of the feed region, the characteristics of the feed fluid, such as the viscosity of the feed fluid and the nature, e.g., size, shape, and/or amount, of any suspended matter, and the desired operating parameters, such as crossflow pressure differential and flow rate. A higher shear, e.g., a shear generating a shear rate of at least about 10,000 $\text{sec}^{-1}$ or at least about 50,000 $\text{sec}^{-1}$ or at least about 100,000 $\text{sec}^{-1}$ or generating a shear stress of at least about 1 pascal or at least about 50 pascals or at least about 500 pascals, greatly facilitates treatment of the feed fluid. For example, a high shear can reduce or eliminate gel layers at the feed surface 20 of the fluid treatment medium 13, increasing permeate throughput and/or service life of the fluid treatment module 12. Further, a high shear can effect the separation of species small enough to pass through the fluid treatment medium 13, as disclosed, for example, in U.S. Pat. No. 6,478,969 B2. However, generating a high shear may involve a rapid flow of feed fluid along the feed surfaces 20 of the fluid treatment media 13 of the fluid treatment modules 12. The rapid flow of feed fluid may, in turn, involve a large crossflow pressure differential in the feed side pressure along the feed regions 21 between the feed end 26 of the initial fluid treatment module 12 and the retentate end 27 of the final module 12, as shown in FIG. 6. The plurality of fluid treatment modules 12 divides this crossflow pressure differential into smaller increments between the feed end 26 and the retentate end 27 of each module 12. Generally, a higher desired shear may suggest shorter fluid treatment modules 12 to lessen the crossflow pressure differential increment from the feed end 26 to the retentate end 27 of each module 12. For example, the effective axial length of each fluid treatment module 12, and the corresponding feed region 21, from the feed end 26 to the retentate end 27, excluding the depth of penetration of any potting compound or other sealant at the ends of the module, may be in the range from about one centimeter or less to about 100 centimeters or more. For some embodiments, the lengths may be in the range from about 3 centimeters or less to about 10 centimeters or more. For other embodiments, the lengths may be in the range from about 10 centimeters or less to about 20 centimeters or more or to about 30 centimeters or more or to about 50 centimeters or more. The lengths of the modules 12 and the crossflow pressure differential increments may be substantially equal to one another or may be different from one another within the fluid treatment arrangement 10. The number of fluid treatment modules, and the lengths of the modules, in a fluid treatment arrangement may vary from one fluid treatment arrangement to another and may be determined, for example, in accordance with the desired crossflow pressure differential of the fluid treatment arrangement and the desired crossflow pressure differential increments of the fluid treatment modules.

As the feed fluid passes along the feed region 21 of each fluid treatment module 12, a portion of the feed fluid may pass as permeate along a second fluid flow path through the fluid treatment medium 13 from the feed surface 20 to the permeate surface 22 and into the permeate region 23 of each module 12. As the fluid passes through, and/or along, the fluid treatment medium 13, the fluid may be treated in any of a wide variety of ways in accordance with the fluid treatment characteristic of the medium 13. The permeate passes from the permeate region 23 of each fluid treatment module 12 into the core assembly 11 and then exits the housing assembly 40 via the permeate outlet port 47.

From the permeate region of at least one fluid treatment module, the permeate may pass through a control mechanism fluidly coupled to the permeate region to control a flow parameter in the permeate region of the module. For many embodiments, the permeate may pass from the permeate region of the plurality of fluid treatment modules respectively through a plurality of control mechanisms to control a flow parameter in the permeate region of each module. For example, the permeate may pass along the second fluid flow path generally inwardly from the permeate region 23 of each fluid treatment module 12 through a control mechanism 32 in the opening 35 in the wall 34 of the core assembly 11 and into the sole longitudinal permeate flow passage 33 of the core assembly 11, as shown in FIG. 1. From the longitudinal flow passage 33, the permeate may exit the housing assembly 40 of the fluid treatment arrangement 10 via the permeate outlet port 47. Alternatively, as shown in FIG. 5, the permeate may pass along the second fluid flow path generally inwardly from the permeate region 23 of each fluid treatment module 12 into the radial permeate flow passage 36a-e of the core assembly 11 which is fluidly coupled to that permeate region 23. From each radial flow passage 36a-e, the permeate may pass into a longitudinal flow passage 33a-e and through the corresponding control mechanism 32 at the end of the longitudinal flow passage 33a-e. From the control mechanisms 32, the permeate from all of the longitudinal flow passages 33a-e may exit the housing assembly 40 of the fluid treatment arrangement 10 via the permeate outlet port 47.

A control mechanism may control one or more flow parameters in the permeate region of one or more fluid treatment modules in a wide variety of ways. For many embodiments, the control mechanisms may be arranged to provide a predetermined relationship of the flow parameters from one fluid treatment module to another within the fluid treatment arrangement. For example, feed fluid may enter the feed end 26 of the initial fluid treatment module 12 at a first pressure and may exit the retentate end 27 of the final module 12 at a second lower pressure, generating a crossflow pressure differential in the feed side pressure as shown in FIG. 6. The pressure of the feed fluid in the feed regions 21 of the plurality of fluid treatment modules 12 may progressively decrease, e.g., linearly, through successive fluid treatment modules, generating a crossflow pressure differential increment between the feed end 26 and the retentate end 27 of each module 12. The control mechanisms 32 may be arranged to provide smaller variations in transmembrane pressure from fluid treatment module 12 to fluid treatment module 12 within the fluid treatment arrangement 10 and/or similar permeate fluxes in the fluid treatment modules 12, even though the crossflow pressure decreases from module 12 to module 12. For example, the control mechanisms 32 may be arranged so that the permeate flux in each fluid treatment module 12 of the fluid treatment arrangement 10 may be no greater than about 5 times, or no greater than about 2 times, or no greater than about 1.5 times the average of the permeate flux in all of the modules 12. The control mechanisms 32 may even be arranged to provide permeate fluxes in the modules 12 which are substantially the same. For some embodiments, the control mechanisms may progressively differ from one another to successively restrict permeate flows through the control mechanisms decreasingly in adjacent fluid treatment modules 12 from the initial module 12 to the final module 12, thereby decreasing the permeate side pressure from module 12 to module 12 along the fluid treatment arrangement 10. For example, the capillaries may progressively differ, e.g., in length and/or diameter, to successively restrict permeate flow in the permeate regions 23 of successive modules 12. The control mechanisms 32 may then provide transmembrane pressures and corresponding permeate fluxes that vary less, e.g., may be more uniform, from module 12 to module 12. The control mechanisms 32 may be arranged, e.g., the capillaries may be sized, to provide this predetermined relationship of the flow parameters in accordance with many factors, including the crossflow pressure differential, the upstream crossflow shear, including the shear rate or the shear stress, the viscosity and velocity of the feed fluid and/or the permeate, and the nature and amount of fouling of the fluid treatment media.

Many advantages are associated with fluid treatment arrangements and methods embodying one or more aspects of the invention. For example, by controlling the flow parameters in the fluid treatment modules 12 of the fluid treatment arrangement 10, various beneficial predetermined relationships of the flow parameters, including smaller variations in transmembrane pressure and permeate flux from module 12 to module 12, may be provided by the fluid treatment arrangement 10. Reducing these variations leads to more uniform permeate flux through, and less uneven fouling of, the fluid treatment media from fluid treatment module 12 to fluid treatment module 12 and enhanced throughput and/or increased service life of the fluid treatment arrangement.

While various aspects of the invention have been previously described and/or illustrated with respect to several embodiments, the invention is not limited to these embodiments. For instance, one or more features of the invention may be modified without departing from the scope of the invention. For example, each fluid treatment module may include a core positioned within the interior of the module, e.g., along the hollow fibers or the inner periphery of a pleated or spirally wound fluid treatment pack, and/or a housing positioned along the exterior of the module, e.g., around the hollow fibers or around the outer periphery of a pleated or spirally wound fluid treatment pack. The fluid treatment arrangement may then be assembled by permanently or removably connecting the cores of succeeding fluid treatment modules to one another to form a core assembly and/or by permanently or removably connecting the housings of succeeding fluid treatment modules to one another to form a housing assembly.

Fluid treatment arrangements embodying the invention may be modified in many other ways. For example, some embodiments may include control mechanisms that are not physically mounted to the core assembly but are fluidly coupled to the permeate regions of the fluid treatment modules external to the core assembly, e.g., by individual pipes or conduits that extend through or from the core assembly. Further, for some embodiments, the control mechanisms may be part of a dynamic control system that may further include sensors, actuators, and one or more controllers. For example, sensors coupled to a controller may monitor the permeate or retentate from the fluid treatment modules, and the controller may adjust the control mechanisms to maintain, or to vary, the relationship of the flow parameters of the modules.

The present invention is thus not restricted to the particular embodiments which have been described and/or illustrated herein but includes all embodiments and modifications that may fall within the scope of the claims.

The invention claimed is:

1. A fluid treatment arrangement comprising a plurality of fluid treatment modules, wherein each module includes a permeable fluid treatment medium having a feed surface and an opposite permeate surface, a feed region extending along the feed surface of the fluid treatment medium, and a permeate region extending along the permeate surface of the fluid treatment medium, wherein each module further includes a feed end fluidly coupled to the feed region and sealed from the permeate region and a retentate end fluidly coupled to the feed region and sealed from the permeate region, and wherein the fluid treatment modules are fluidly coupled to one another, the retentate end of one fluid treatment module fluidly communicating with the feed end of a succeeding fluid treatment module, a core assembly which extends through the plurality of fluid treatment modules, the core assembly having one or more permeate passages that fluidly communicate with the permeate regions of the fluid treatment modules, and one or more control mechanisms, a control mechanism being fluidly coupled to the permeate region of at least one fluid treatment module to control a flow parameter in the permeate region of the module.

2. The fluid treatment arrangement of claim 1 wherein the one or more control mechanisms comprise a plurality of control mechanisms, each control mechanism being fluidly coupled to the permeate region of a fluid treatment module to control a flow parameter in the permeate region of the module.

3. The fluid treatment arrangement of claim 2 wherein each control mechanism is fluidly coupled to the permeate region of only one module.

4. The fluid treatment arrangement of claim 1 wherein the one or more control mechanisms are physically associated with the core assembly.

5. The fluid treatment arrangement of claim 1 further comprising a housing assembly which includes a cylindrical portion that extends axially along and surrounds the plurality of fluid treatment modules.

6. The fluid treatment arrangement of claim 1 wherein a fluid treatment module includes a generally cylindrical, pleated fluid treatment pack comprising a plurality of longitudinally extending pleats of the feed region, the permeable fluid treatment medium, and the permeate region.

7. The fluid treatment arrangement of claim 1 wherein a fluid treatment medium comprises a plurality of permeable hollow fibers.

8. The fluid treatment arrangement of claim 1 wherein a fluid treatment module includes a generally cylindrical, spirally wound fluid treatment pack comprising a plurality of windings of the feed region, a plurality of windings of the fluid treatment medium, and a plurality of windings of the permeate region.

9. The fluid treatment arrangement of claim 1 wherein at least one of the feed region and the permeate region includes spaces that extend along the fluid treatment medium and are substantially free of structure.

10. The fluid treatment arrangement of claim 1 wherein at least one of the feed region and the permeate region includes a porous sheet material which extends along a surface of the fluid treatment medium.

11. The fluid treatment arrangement of claim 1 wherein the one or more control mechanisms comprise a plurality of control mechanisms fluidly coupled to the plurality of fluid treatment modules, respectively, and wherein the control mechanisms provide a permeate flux in each fluid treatment module that is no greater than about 5 times the average of the permeate fluxes in all of the fluid treatment modules.

12. The fluid treatment arrangement of claim 1 wherein the one or more control mechanisms comprise a plurality of control mechanisms fluidly coupled to the plurality of fluid treatment modules, respectively, and wherein the control mechanisms provide a permeate flux in each fluid treatment module that is no greater than about 2 times the average of the permeate fluxes in all of the fluid treatment modules.

13. A fluid treatment arrangement comprising a core assembly having a longitudinal axis, a plurality of fluid treatment modules mounted to the core assembly and axially positioned along the core assembly, wherein each fluid treatment module includes a permeable fluid treatment medium having a feed surface and an opposite permeate surface, a feed region extending along the feed surface of the fluid treatment medium, a permeate region extending along the permeate surface of the fluid treatment medium, a feed end fluidly coupled to the feed region and sealed from the permeate region, and a retentate end fluidly coupled to the feed region and sealed from the permeate region and wherein the plurality of fluid treatment modules are fluidly coupled along the core assembly, the retentate end of one fluid treatment module fluidly communicating with the feed end of a succeeding fluid treatment module, and one or more control mechanisms, wherein a control mechanism is fluidly coupled to a permeate region of at least one fluid treatment module through the core assembly to control a flow parameter in the permeate region of the fluid treatment module.

14. The fluid treatment arrangement of claim 13 wherein the one or more control mechanisms comprise a plurality of control mechanisms, each control mechanism being fluidly coupled to the permeate region of a fluid treatment module to control a flow parameter in the permeate region of the module.

15. The fluid treatment arrangement of claim 14 wherein each control mechanism is fluidly coupled to the permeate region of only one fluid treatment module.

16. The fluid treatment arrangement of claim 13 wherein the one or more control mechanisms are physically associated with the core assembly.

17. The fluid treatment arrangement of claim 13 wherein the core assembly has a generally longitudinal passage and wherein each of the one or more control mechanisms is fluidly coupled between the permeate region of a fluid treatment module and the longitudinal passage in the core assembly.

18. The fluid treatment arrangement of claim 13 wherein the one or more control mechanisms comprise a plurality of control mechanisms and wherein the core assembly includes a plurality of permeate passages fluidly isolated from one another, each permeate passage being fluidly coupled to the permeate region of a fluid treatment module and each control mechanism being fluidly coupled to a permeate passage.

19. The fluid treatment arrangement of claim 18 wherein the plurality of control mechanisms are disposed in the core assembly.

20. The fluid treatment arrangement of claim 18 wherein the plurality of control mechanisms are positioned external to the core assembly.

21. The fluid treatment arrangement of claim 13 further comprising a housing assembly surrounding the feed region, the fluid treatment medium, and the permeate region of each fluid treatment module.

22. A method of treating a fluid comprising:
passing a feed fluid through feed regions and along feed surfaces of permeable fluid treatment media of a plurality of fluid treatment modules, including directing feed fluid from the feed region at the retentate end of one fluid treatment module into the feed region at the feed end of a succeeding fluid treatment module;
in each fluid treatment module, passing a portion of the feed fluid in the feed region as permeate from the feed surface of the fluid treatment medium through the permeable fluid treatment medium to the permeate surface of the fluid treatment medium and into a permeate region;
passing permeate from the permeate region of each fluid treatment module into and axially along a core assembly which extends through the plurality of fluid treatment modules; and
passing permeate from a permeate region of at least one fluid treatment module through a control mechanism fluidly coupled to the permeate region, including controlling a flow parameter in the permeate region of the at least one module.

23. The method of claim 22 wherein passing permeate from a permeate region through a control mechanism includes passing permeate from the permeate regions of the fluid treatment modules respectively through control mechanisms mounted to the core assembly and fluidly coupled to the permeate regions, including controlling a flow parameter in the permeate region of each module.

24. The method of claim 23 wherein passing permeate through control mechanisms includes establishing a predetermined relationship of the flow parameters from fluid treatment module to fluid treatment module.

25. The method of claim 23 wherein passing permeate through control mechanisms includes providing a permeate flux through the fluid treatment medium of each fluid treatment module that is no greater than about 5 times the average of the permeate fluxes through the fluid treatment media of the plurality of fluid treatment modules.

26. The method of claim 23 wherein passing permeate through control mechanisms includes providing a permeate flux through the fluid treatment medium of each fluid treatment module that is no greater than about 2 times the average of the permeate fluxes through the fluid treatment media of the plurality of fluid treatment modules.

27. The method of claim 23 wherein passing permeate through control mechanisms includes providing permeate fluxes through the fluid treatment media of the plurality of fluid treatment modules that are substantially equal to one another.

28. The method of claim 22 wherein passing a feed fluid through the feed regions of the plurality of fluid treatment modules includes generating a shear stress near the feed surface of the fluid treatment medium of one or more of the fluid treatment modules.

* * * * *